(12) United States Patent
Gordon

(10) Patent No.: US 8,380,894 B2
(45) Date of Patent: Feb. 19, 2013

(54) I/O MAPPING-PATH TRACKING IN A STORAGE CONFIGURATION

(75) Inventor: Mark R. Gordon, Portland, OR (US)

(73) Assignee: International Business Machines Corporation, Armonk, NY (US)

( * ) Notice: Subject to any disclaimer, the term of this patent is extended or adjusted under 35 U.S.C. 154(b) by 73 days.

(21) Appl. No.: 12/635,745

(22) Filed: Dec. 11, 2009

(65) Prior Publication Data

US 2011/0145448 A1    Jun. 16, 2011

(51) Int. Cl.
*G06F 3/00* (2006.01)
(52) U.S. Cl. .......... 710/38; 710/305; 710/316; 370/389; 370/392; 370/393; 711/114; 711/202; 711/207; 714/45
(58) Field of Classification Search .......................... None
See application file for complete search history.

(56) References Cited

U.S. PATENT DOCUMENTS

| | | | |
|---|---|---|---|
| 4,757,447 A | 7/1988 | Woffinden | 711/207 |
| 5,668,968 A | 9/1997 | Wu | 711/3 |
| 5,996,062 A | 11/1999 | Sachs | 712/215 |
| 6,000,020 A * | 12/1999 | Chin et al. | 711/162 |
| 6,535,954 B2 * | 3/2003 | Obara et al. | 711/114 |
| 6,671,776 B1 * | 12/2003 | DeKoning | 711/114 |
| 6,883,162 B2 * | 4/2005 | Jackson et al. | 717/124 |
| 6,922,766 B2 * | 7/2005 | Scott | 711/202 |
| 7,299,335 B2 * | 11/2007 | Moyer | 711/205 |
| 7,356,026 B2 * | 4/2008 | Scott et al. | 370/389 |
| 7,577,816 B2 * | 8/2009 | Sheets et al. | 711/206 |
| 7,668,981 B1 * | 2/2010 | Nagineni et al. | 710/38 |
| 7,805,565 B1 * | 9/2010 | Milligan et al. | 711/114 |
| 7,814,241 B2 * | 10/2010 | Honda | 710/38 |
| 7,853,832 B2 * | 12/2010 | Lange et al. | 714/45 |
| 7,853,928 B2 * | 12/2010 | Attinella | 717/128 |
| 2004/0036623 A1 | 2/2004 | Chung | 340/8.1 |
| 2004/0044872 A1 * | 3/2004 | Scott | 711/202 |
| 2006/0092828 A1 * | 5/2006 | Aoki et al. | 370/216 |
| 2006/0176880 A1 | 8/2006 | Bare et al. | 370/392 |
| 2006/0206662 A1 * | 9/2006 | Ludwig et al. | 711/114 |
| 2006/0271919 A1 * | 11/2006 | Moyer | 717/136 |
| 2007/0061302 A1 | 3/2007 | Ramer et al. | 1/1 |

(Continued)

FOREIGN PATENT DOCUMENTS

| | | |
|---|---|---|
| EP | 0144121 A2 | 12/1985 |
| EP | 0395835 A2 | 7/1990 |

(Continued)

OTHER PUBLICATIONS

"Context-Aware Prefetching at the Storage Server" by Soundararajan et al., from USENIX 2008.*

(Continued)

*Primary Examiner* — Steven Snyder
(74) *Attorney, Agent, or Firm* — Andrea Bauer; Hoffman Warnick LLC

(57) ABSTRACT

A system, method and program product for tracking an I/O mapping-path among a plurality of nodes in a storage configuration. A system is disclosed that includes: a path tracking manager implemented at a host system that enables I/O mapping-path tracking for an I/O request being serviced within the storage configuration; and a path tagging system implemented at each of a plurality of virtual storage nodes within the storage configuration, wherein each path tagging system appends mapping-path information to the I/O request in response to receiving and processing the I/O request.

27 Claims, 7 Drawing Sheets

U.S. PATENT DOCUMENTS

| | | | | |
|---|---|---|---|---|
| 2007/0280244 A1* | 12/2007 | Kikuchi et al. | ............... | 370/392 |
| 2008/0059729 A1* | 3/2008 | Norberg et al. | ............... | 711/159 |
| 2008/0263309 A1* | 10/2008 | Attinella | ....................... | 711/173 |
| 2009/0037555 A1* | 2/2009 | Ueno et al. | ..................... | 709/213 |
| 2009/0100298 A1* | 4/2009 | Lange et al. | .................... | 714/45 |
| 2010/0211827 A1* | 8/2010 | Moyer et al. | .................... | 714/45 |
| 2011/0055471 A1* | 3/2011 | Thatcher et al. | ............. | 711/114 |

FOREIGN PATENT DOCUMENTS

| | | |
|---|---|---|
| GB | 2193823 | 2/1988 |
| JP | 2000244563 A * | 9/2000 |

OTHER PUBLICATIONS

'Traceroute Using an IP Option' by G. Malkin, Xylogics, Inc., Jan. 1993.*
Machine Translation of JP 2000244563A.*
Wikipedia article on 'Disk Array' from Mar. 8, 2009.*
Wikipedia article on 'Disk Array Controller' from Feb. 10, 2009.*
Machine Translation of Japanese Patent Application JP 2000244563 A published Sep. 8, 2000.*

* cited by examiner

| Host vdisk | Path Tag | Executing System | Executing Location | Resp Time | Block Size |
|---|---|---|---|---|---|
| HostA-vdiskB | (HostA,vdiskB, pdisk3),(RaidA,vdiskA,pdisk1) | RaidA | pdisk1 | 15 | 4096 |
| HostA-vdiskB | (HostA,vdiskB, cache) | HostA | cache | 1 | 4096 |
| HostA-vdiskB | (HostA,vdiskB, pdisk3),(RaidA,vdiskA, cache) | RaidA | cache | 2 | 4096 |
| HostA-vdiskA | (HostA,vdiskA, cache) | HostA | cache | 1 | 4096 |
| HostA-vdiskA | (HostA,vdiskA, pdisk1) | HostA | pdisk1 | 12 | 2096 |
| HostA-vdiskB | (HostA,vdiskB, cache) | HostA | cache | 1 | 4096 |
| HostA-vdiskB | (HostA,vdiskB, cache) | HostA | cache | 1 | 4096 |

Figure 4

| Host vdisk | Path Tag | Executing System | Executing Location | Resp Time | Block Size |
|---|---|---|---|---|---|
| HostB-vdiskA | (HostB,vdiskA,cache) | HostA | cache | 1 | 4096 |
| HostB-vdiskA | (HostB,vdiskA,pdisk1),(DVS1,vdiskA,cache) | DVS1 | cache | 2 | 4096 |
| HostB-vdiskA | (HostB,vdiskA,pdisk1),(DVS1,vdiskA,pdisk1),(RAIDB,vdiskA,pdisk1) | RAIDB | pdisk1 | 35 | 4096 |
| HostB-vdiskA | (HostB,vdiskA,pdisk1),(DVS1,vdiskA,pdisk1),(RAIDB,vdiskA,pdisk1) | RAIDB | pdisk1 | 20 | 4096 |
| HostB-vdiskA | (HostB,vdiskA,pdisk1),(DVS1,vdiskA,pdisk1),(RAIDB,vdiskA,pdisk2) | RAIDB | pdisk2 | 30 | 4096 |
| HostB-vdiskA | (HostB,vdiskA,pdisk2),(DVS1,vdiskA,pdisk2),(RAIDC,vdiskA,pdisk1) | RAIDC | pdisk1 | 10 | 4096 |
| HostB-vdiskA | (HostB,vdiskA,pdisk2),(DVS1,vdiskA,pdisk2),(RAIDC,vdiskA,pdisk1) | RAIDC | pdisk1 | 10 | 4096 |
| HostB-vdiskA | (HostB,vdiskA,pdisk2),(DVS1,vdiskA,pdisk2),(RAIDC,vdiskB,pdisk2),(RAIDC,vdiskA,cache) | RAIDC | cache | 1 | 4096 |
| HostB-vdiskA | (HostB,vdiskA,pdisk2),(DVS1,vdiskA,pdisk2),(RAIDC,vdiskB,pdisk2),(RAIDC,vdiskA,cache) | RAIDC | cache | 1 | 4096 |
| HostB-vdiskA | (HostB,vdiskA,pdisk2),(DVS1,vdiskA,pdisk2),(RAIDC,vdiskB,pdisk2),(RAIDC,vdiskA,cache) | RAIDC | cache | 1 | 4096 |
| HostB-vdiskA | (HostB,vdiskA,pdisk1),(DVS1,vdiskA,pdisk1),(RAIDB,vdiskA,pdisk1) | RAIDB | pdisk1 | 40 | 4096 |

Figure 5

| vdisk | Path Tag | Source System | Source vdisk |
|---|---|---|---|
| RAIDC-vdiskA | (HostB,vdiskA,pdisk2),(DVS1,vdiskB,pdisk2) | HostB | vdiskA |
| RAIDC-vdiskB | (HostB,vdiskA,pdisk2),(DVS1,vdiskB,pdisk3) | HostB | vdiskA |

Figure 6

I/O MAPPING-PATH TRACKING IN A STORAGE CONFIGURATION

FIELD OF THE INVENTION

This disclosure is related generally to storage systems, and more particularly to a system and method of identifying an I/O mapping-path to a physical storage device within a storage configuration, where the mapping-path identifies the nodes traversed by the I/O, as well as the virtual-to-physical storage mapping done at each node for the I/O operation.

BACKGROUND OF THE INVENTION

In complex computer storage environments involving, e.g., multiple hosts and/or storage systems, the ability to provide efficient input/output (I/O) operations to and from physical storage remains an important task for system administrators. Often, noticeable performance degradations will occur as a result of slow I/O operations within a storage device. The ability to quickly analyze and resolve the problem can be critical to maintaining a high performing system.

On host systems (i.e., servers) where the physical disks are directly attached to the system initiating I/O, currently available performance analysis tools on a host can be used to evaluate I/O performance at the level of each physical disk, since the operating system initiates the I/O on the physical disk, and can track the response time.

However, with the advent of technologies such as RAID (redundant array of inexpensive disks) disk systems, data is divided and stored amongst a set of physical disks but appears as a single disk to the host system. However, because the RAID system presents a virtual disk (often called a LUN) to the host system (which treats it as a physical disk, i.e. performs I/O operations on the virtual disk), it is not possible for the host system to determine the physical disk which is actually accessed when the host system initiates an I/O operation on such a presented disk. Instead, a virtual to physical mapping is done in the RAID system, independently of the host system. In a simple case, the physical disk is one level removed from the host which initiated the I/O.

This problem is further exacerbated with the use of disk virtualization systems, which can for instance be installed between the host system and a RAID system. In this case, the disk virtualization system creates yet another level of virtual to physical mapping. The virtual disk created on the RAID system is presented to the disk virtualization system, which treats the presented virtual disk as its physical disk. The disk virtualization system can combine one or more disks presented to it by RAID disk systems to create a single virtual disk, which is presented to the host system as a single disk. In this case, the actual physical disk is two systems removed from the host system which initiates the I/O.

In these latter cases, it is not possible for the host system to determine the physical location where an I/O request is actually serviced. This causes various types of problems in performance and capacity monitoring. First, in the case of performance analysis, when the response times on one or more disks used by the host are slow, it is not possible to easily determine the exact location where the I/O was satisfied, which is key to finding the root cause of the slow I/O. In limited situations the physical location can be approximated by merging host and disk performance and topology data—see, for example, http://www.ibm.com/support/techdocs/atsmastr.nsf/WebIndex/PRS1230. However, one cannot determine where (i.e., which system—in cache or on disk) a specific I/O operation was fulfilled at with current technology and processes.

Secondly, in the case of capacity planning, when there are many applications using a disk virtualization or RAID system, the host system cannot determine what load it is generating (e.g., I/Os per second satisfied in cache or on physical disk) in the disk virtualization or RAID system. If planning to scale up one application that shares the RAID system with many applications, in order to assess whether the RAID system must be upgraded to support the added workload, one must be able to determine what percent of the RAID system load is initiated by the workload that is changing.

SUMMARY OF THE INVENTION

The present invention relates to a system, method and program product for tracking I/O mapping-paths in a storage configuration.

In one embodiment, there is a system for tracking an I/O mapping-path among a plurality of nodes in a storage configuration, comprising: a path tracking manager implemented at a host system that enables I/O mapping-path tracking for an I/O request being serviced within the storage configuration; and a path tagging system implemented at each of a plurality of virtual storage nodes within the storage configuration, wherein each path tagging system appends mapping-path information (e.g., virtual-to-physical mapping and node location) to the I/O request in response to receiving and processing the I/O request.

In a second embodiment, there is a method for tracking an I/O mapping-path among a plurality of nodes in a storage configuration, comprising: enabling I/O mapping-path tracking at a host system for an I/O request being serviced within the storage configuration; issuing the I/O request to the storage configuration, wherein the storage configuration includes a plurality of virtual storage nodes; appending mapping-path information to the I/O request at each virtual storage node that processes the I/O request; servicing the I/O request at a physical disk; and returning the mapping-path information to the host system.

In a third embodiment, there is a computer readable storage medium having a program product stored thereon for tracking an I/O mapping-path among a plurality of nodes in a storage configuration, comprising: a first program code segment executable by a host system that enables I/O mapping-path tracking for an I/O request being serviced within the storage configuration; and a second program code segment executable by each of a plurality of virtual storage nodes within the storage configuration, wherein the second program code segment appends mapping-path information to the I/O request in response to receiving and processing the I/O request.

In a fourth embodiment, there is a method for deploying a system for tracking an I/O mapping-path among a plurality of nodes in a storage configuration, comprising: providing a computer infrastructure being operable to: enable I/O mapping-path tracking from a host system for an I/O request being serviced within the storage configuration; and append mapping-path information to the I/O request at a virtual storage node within the storage configuration in response to receiving and processing the I/O request.

The illustrative aspects of the present invention are designed to solve the problems herein described and other problems not discussed.

BRIEF DESCRIPTION OF THE DRAWINGS

These and other features of this invention will be more readily understood from the following detailed description of the various aspects of the invention taken in conjunction with the accompanying drawings.

FIG. 4 depicts a sample report for the storage configuration of FIG. 2 in accordance with an embodiment of the invention.

FIG. 5 depicts a sample report for the storage configuration of FIG. 3 in accordance with an embodiment of the invention.

FIG. 6 depicts a sample report from a non-host system in accordance with an embodiment of the invention.

Figure 1:
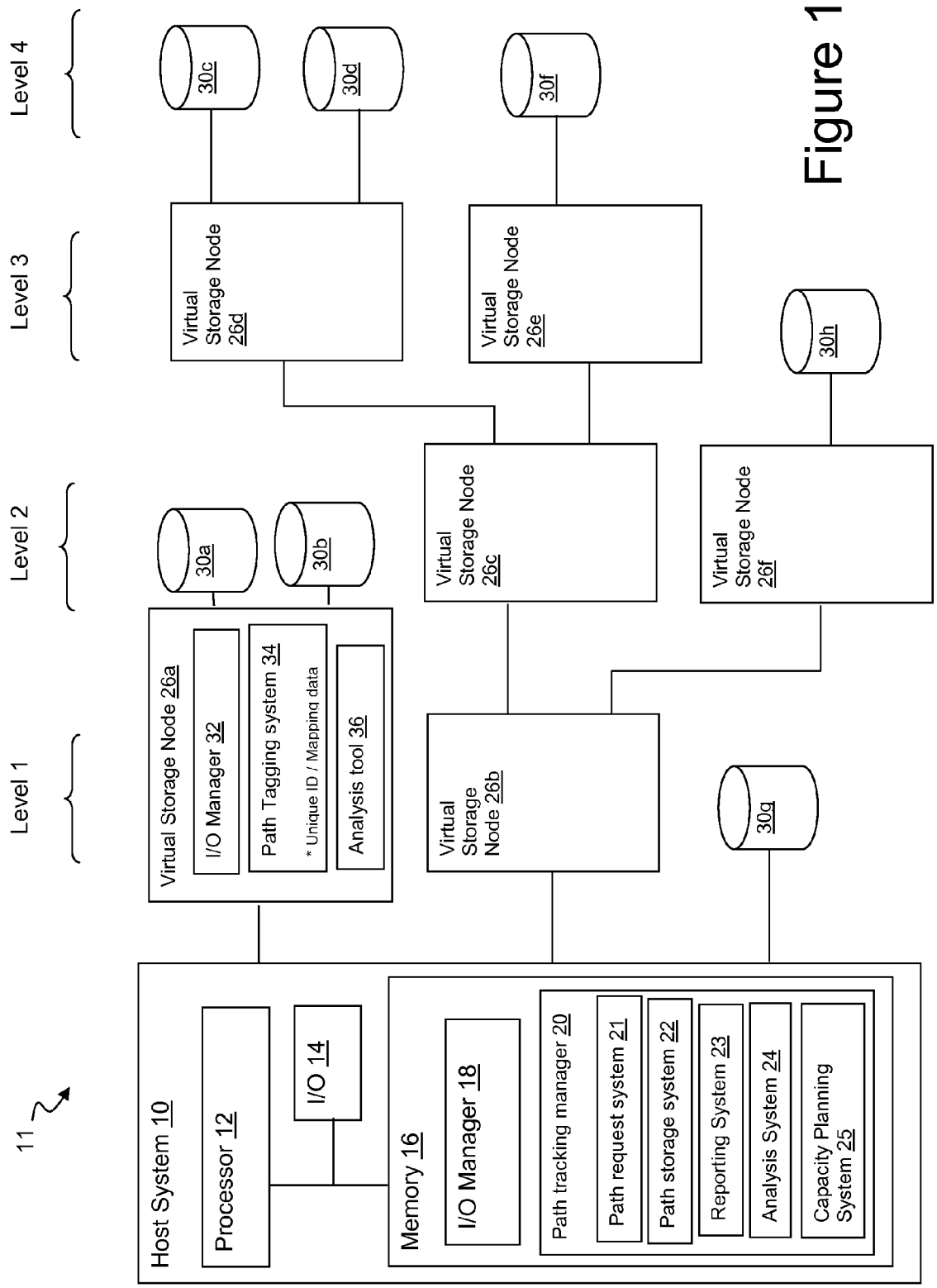
FIG. 1 depicts a storage configuration in accordance with an embodiment of the present invention.

The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

Described herein is a solution for allowing a host system to collect mapping-path information of an executed I/O operation within a multi-level storage configuration. FIG. 1 depicts an embodiment of an illustrative storage configuration 11 that can generally be described as a network of nodes made up of a host system 10, a plurality of virtual storage nodes 26a-f, and a plurality of physical storage units 30a-h. In this example, the storage configuration 11 includes four levels at which virtual storage nodes 26a-f or physical storage units 30a-h exist within the network.

When a request for a storage read or write (I/O operation) is issued by the host system 10, the request is mapped and executed either directly on an attached physical storage unit 30g or on a device emulated by a level 1 virtual storage node 26a, 26b. If the request is mapped to one of the level 1 virtual storage nodes 26a, 26b, the virtual storage node will in turn map and forward the request to either a physical storage unit 30a, 30b or to a device emulated by a level 2 virtual storage node 26c, 26f, and so on until a physical storage unit is reached to perform the I/O operation. If the request involves a write operation, data to be written will flow with an associated request through a set of nodes from the host system 10 to a destination physical storage unit. If the request involves a read operation, a request will flow through a set of nodes to a destination physical storage unit, and the resulting read data will flow back along the same path to the host system 10. In both cases, a reply status or response will be returned to the host.

Each virtual storage node 26a-f may comprise any device or system for independently mapping an I/O operation executed from an upstream node to locally attached disks or to virtual disks presented from one or more downstream nodes, and for handling requests and forwarding data. Illustrative examples of storage virtualization devices include, but are not limited to, RAID systems, disk virtualization systems, a hardware controller that combines one or more physical disks to create a virtual disk space, a server, a storage array, etc. In general, each virtual storage node 26a-f (as well as the host system) includes an I/O manager 32 for handling such tasks. The I/O manager 32 is responsible for maintaining a mapping of which locally attached disks or disks presented by downstream nodes are combined to create virtual disks that are presented to upstream nodes.

In order to obtain I/O mapping-path information, i.e., the path traversed throughout the storage hierarchy 11 to perform an I/O operation together with the virtual to physical (or upstream to downstream) mapping performed at each node, storage configuration 11 includes a path tracking system that comprises a path tracking manager 20 installed at the host system 10 and a path tagging system 34 installed at each virtual storage node 26a-f. Path tracking manager 20 generally includes: a path request system 21 for initiating and enabling path collection operations; a path storage system 22 for capturing and storing returned mapping-path information; a reporting system 23 for outputting formatted mapping-path information, e.g., for an administrator; an analysis system 24 for automatically analyzing mapping-path information, e.g., to identify and alert for problematic storage paths; and a capacity planning system 25 for facilitating the storage planning.

Each path tagging system 34 includes the necessary functionality to append mapping and ID information to an I/O request prior to forwarding of the request. As the I/O request traverses through the storage configuration 11, mapping-path information at each traversed node is collected to describe the path taken to fulfill the host I/O operation. Once the I/O request is serviced by a physical storage device, mapping-path information can be returned to the host system 10 with a reply message, e.g., with the read data, with an execution status reply, etc.

In one embodiment, path request system 21 is initiated by an administrator via an interface, which in turn incorporates an I/O mapping-path collection request into a command associated with the I/O request. For instance, an I/O request may comprise a binary sequence generated according to an agreed upon protocol. Either an existing protocol could be extended, or a new protocol could be created, to allow for a flag to be set to notify downstream nodes that path collection is enabled. When the I/O request is passed to a virtual storage node 26a-f with the flag enabled, the path tagging system 34 is called to append mapping-path information, i.e., a unique ID of the virtual storage node 26a-f and mapping information, to the request.

Once the I/O operation is serviced by the appropriate physical storage unit 30a-h, the complete set of mapping-path information is returned to the host system 10 where the path storage system 22 extracts and stores the mapping-path information. In an alternative embodiment, the mapping-path information could be collected in an inbound fashion, i.e., as part of a reply message (e.g., execution status) being returned to the host system 10.

As noted, reporting system 23 provides a mechanism by which formatted reports can be outputted for the administrator. In a simple example, the administrator could enable path collection for a single I/O operation via the path tracking manager 20, which would output a path taken to fulfill the I/O operation. In more involved situations, path collection could be enabled for a period of time, and a set of paths along with additional performance information could be collected and displayed in a comprehensive report, such as that shown in FIGS. 4 and 5.

Analysis system 24 provides a mechanism by which path and performance information collected by the path tracking manager 20 can be automatically analyzed. For instance, if the performance associated with a path, virtual storage device or physical device is continually slower than other paths and devices or some threshold, a warning or alert could be issued. In addition, analysis system 24 can ascertain and report whether the I/O request resulted in a cache hit and cache miss on a device that is not locally attached to the host system 10.

Capacity planning system 25 may be implemented to assist in planning out or modifying the storage configuration 11 based on new or planned usage requirements. For example, if an administrator learns that an application that shares a RAID system with many other applications is about to be scaled up, capacity planning system 25 can determine what percent of the RAID system load is initiated by the application that is changing. Based on this, an assessment can be made whether the RAID system must be upgraded to support the added workload. Capacity planning system 25 thus can determine storage requirements for proposed workload changes based on mapping-path tracking results from a plurality of previously serviced I/O requests.

In a further embodiment, a path analysis tool could be installed and run from a virtual storage node 26a-f. This would allow, e.g., the virtual storage node 26a-f to collect information, such as what host system initiated different I/O operations. This information could be forwarded to a host system 10 for analysis, or obtained by accessing a virtual storage node. This information could also be used by the virtual storage node to alter its handling of the I/O request, such as changing the priority, or altering prefetch or caching activity.

Referring now to FIG. 2-5, more particular illustrative embodiments are described.

DEFINITIONS

The following definitions are provided to better understand these embodiments.

Pdisk—a label used by a host, disk virtualization system, or RAID device for a device on which it initiates I/O operations. I/O initiated by one system on a pdisk may be satisfied on a local physical disk or on a physical disk on another system, as described below. That is, a pdisk can be a local physical disk, or a virtual (emulated) disk that is presented to a system by a RAID or storage virtualization system. Note that in the figures, pdisks are shown external to an associated system to highlight that each one represents a device external to the respective system. However, it is understood that figures are not intended to be limiting in this manner, and that each pdisk could have been shown inside an associated system.

Vdisk—denotes a virtual disk (i.e., LUN), which is created in a host, disk virtualization system, RAID software or hardware by combining one or more pdisks attached to that system. On the host system, the application data is defined on vdisks.

Physical disk—a real hardware device that stores data, including RAM disks, magnetic disk storage, optical storage or other media.

Host—(host system) a computer system such as a server on which an application program runs.

RAID system—a special purpose computing system, which has software that manages physical disks and combines them into vdisks (LUNs) that are presented to another system.

Disk virtualization system—a special purpose computing system, which has software that manages vdisks presented to it. A disk virtualization system treats vdisks presented to it as its pdisks. A disk virtualization system combines its pdisks into vdisks that are presented to another system, usually a host.

Illustrative Embodiments

A prerequisite for I/O mapping-path tracking is that each system (i.e., host, disk virtualization system, or RAID system) has a unique identifier that identifies the system in the storage configuration being monitored. Within each subsystem, each pdisk must have a unique identifier. The pdisk unique identifier can be of any format, such as a serial number or unique ID, or a topology description (e.g. adapter, fibre, disk number) that uniquely identifies each pdisk within in a subsystem.

I/O mapping-path tracking may be implemented as a recursive algorithm, where each subsystem appends its own identifier and "vdisk to pdisk translation/mapping" to an address tag associated with a memory operation.

On a host system, I/O is executed on a vdisk, and the host system translates the vdisk I/O to a pdisk, and initiates a physical I/O operation on a pdisk. The host system adds an address tag to the outgoing I/O command. The tag contains the host system ID, vdisk, and pdisk.

If the I/O operation is on a physical disk, then the tag is returned by the disk along with the other information (data, status, etc.) that are currently returned with each I/O operation.

If the I/O operation is on a pdisk which is not a physical disk, but a vdisk presented to the host by another system (e.g., a RAID or disk virtualization system), then the presenting subsystem accepts the requestor's address tag along with the I/O operation and any data passed from the host. Since the requestors I/O operation is being executed on a vdisk on the presenting subsystem, the presenting subsystem converts the requested vdisk address to a pdisk address, appends its system ID, vdisk, pdisk tag after the host address tag, and the presenting subsystem executes the I/O on its pdisk.

If at this step, the I/O operation references a physical disk, the combined address tag is returned with the result of the I/O operation. If the operation is on a vdisk presented by another subsystem, then the process is repeated on the next subsystem in the I/O mapping-path.

This process can be implemented similarly for more levels, as when for example there are one or more disk virtualization systems between the host and the RAID disks system which contains the physical disks. For example, an AIX host system could be connected to an AIX VIO server, which is connected to an IBM SVC storage virtualization server, which is connected to IBM DS8000 disk array system.

This process can also be implemented in a hardware controller, where the controller combines one or more physical disks together to create vdisks that it presents to the computer system where the controller is attached.

It is not a requirement that the host initiating the I/O operation append its information in the address tag. The host can store its information separately, and then merge it back with the returned address tag. If the host appends its address tag to the initial I/O operation, then it is possible for the disk virtualization system, or the RAID system to extract the host information from the incoming I/O request, in order to do analysis of the performance characteristics of the incoming I/O requests (e.g., local cache hit rate, I/O rate and access patterns) based on the host ID, host vdisk, or host pdisk. As an example, a RAID system could be enabled to recognize when I/O to several RAID vdisks was initiated on a single host vdisk (since a host vdisk can map to several pdisks on the host, and then be remapped to more or fewer pdisks on a disk virtualization system). The RAID system could then alter the caching or prefetch activity on these vdisks as a group, rather than individually.

Since the address path tag contains intermediate subsystems (such as disk virtualization systems) in addition to the host that initiated the I/O and the host that fulfills the I/O, the intermediate subsystem locations can be extracted by the host from the address path tag, in order to determine whether performance problems are associated with I/O passing through an intermediate system.

Each subsystem adds virtual to physical translation/mapping information (system ID, vdisk, pdisk) to the address tag. The address tag is not limited to these three items. It could also contain information such as elapsed time on a system for an operation, which could be used to determine the components of time on the I/O mapping-path.

It is not necessary for the I/O mapping-path tag to be sent and filled on each operation. I/O mapping-path tags can be enabled or disabled via commands or program interfaces as needed for monitoring.

Figure 2:
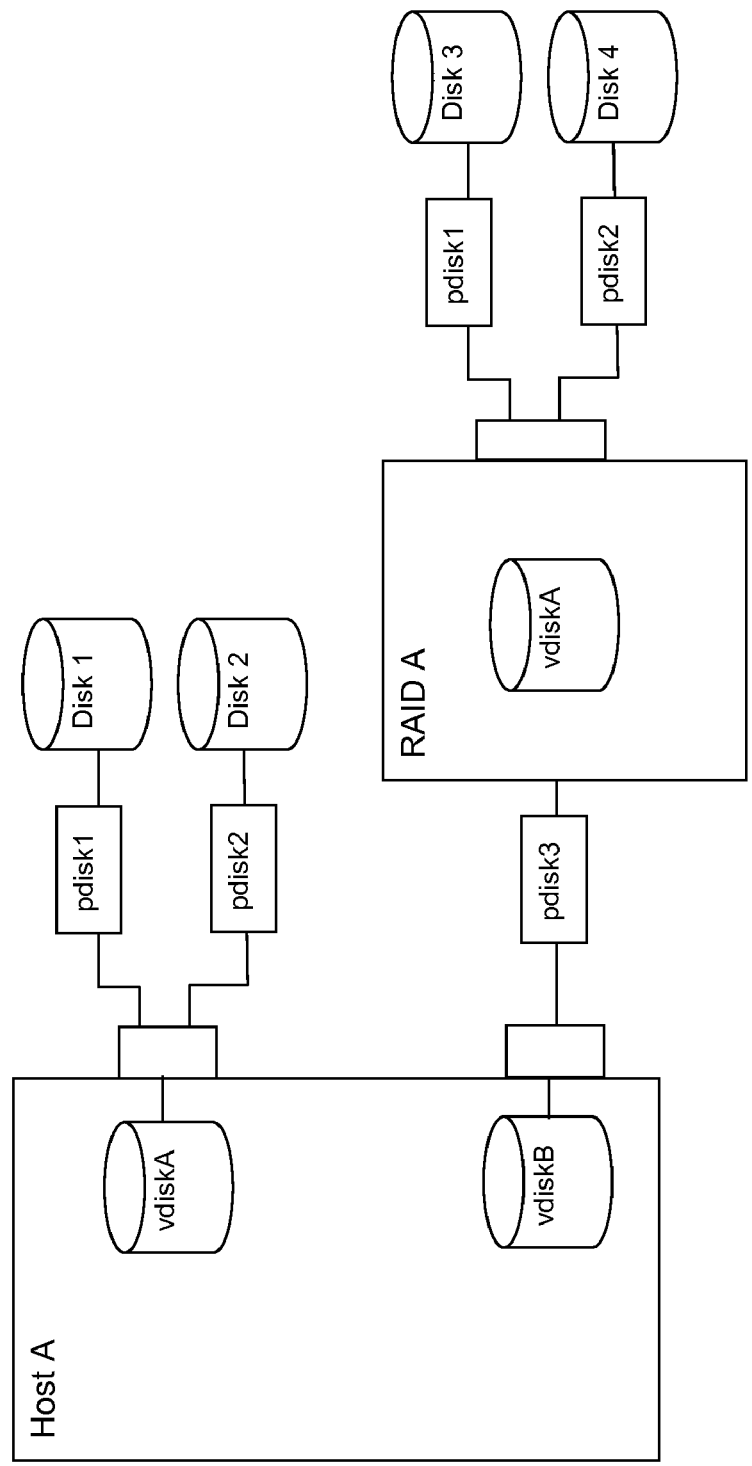
FIG. 2 depicts a further storage configuration in accordance with an embodiment of the present invention.

Referring now to FIG. 2, an illustrative storage configuration 40 is shown involving a host (HostA) that has two virtual disks (vdiskA and vdiskB), each defined in the host system software as one or more pdisks. In the case, vdiskA is defined with two pdisks (pdisk1 and pdisk2) that are the host's labels for two actual physical disks (Disk1 and Disk2). VdiskB is defined with pdisk3, which is the host's label for vdiskA within RAIDA, which is in turn defined by pdisk1 and pdisk2 that are RAIDA's labels for physical disks Disk3 and Disk4.

Consider the case where a virtual I/O operation is issued to vdiskA. If the I/O can be fulfilled from in-memory disk cache on HostA, the I/O is completed, and the address tag (HostA, vdiskA, cached) is returned with the response of the I/O operation. When the I/O returns, the path tag is retrieved and saved along with other performance related information (such as response time or data size).

If the I/O request cannot be fulfilled from in-memory cache on HostA, the operating system determines which pdisk contains the block of data being read. If, for example, the block is on HostA-pdisk1, the I/O request is tagged with (HostA, vdiskA, pdisk1) and it is executed. When the I/O request returns, the complete path tag is retrieved and saved along with other performance related information (such as response time or data size).

Consider a further case where a virtual I/O operation is issued on vdisk B. If the I/O request can be fulfilled from in-memory disk cache on HostA, the I/O is completed, and the address tag (HostA, vdiskB, cached) is returned with the response of the I/O operation. When the I/O reply returns, the path tag is retrieved and saved on the host along with other performance related information (such as response time or data size).

If the I/O request cannot be fulfilled from in-memory cache on HostA, then the operating system determines which block on pdisk3 contains the data corresponding to the I/O request on vdiskB. The I/O request is tagged with the address tag (HostA, vdiskB, pdisk3) and the host operating system issues I/O on pdisk3. When the I/O reply returns, the complete path tag is retrieved and saved on the host along with other performance related information (such as response time or data size).

Since pdisk3 is a vdisk presented to HostA by RAIDA, RAIDA receives this I/O request as a request on its RAIDA-vdiskA device. If RAIDA can fulfill the I/O request on vdiskA from its in-memory cache, it appends its address tag (RAIDA, vdiskA, cached) to the address tag received with the I/O request, and returns the I/O reply to the requesting system.

If RAIDA cannot fulfill the I/O request on vdiskA from its in-memory cache, since RAIDA-vdiskA is striped on two pdisks, RAIDA determines which pdisk (i.e., RAIDA-pdisk1 or RAIDA-pdisk2) holds the block requested for vdiskA, and then appends its information to the address tag received from the Host. For example, if the data is on RAIDA-pdisk1, then RAIDA appends (RAIDA, vdiskA, pdisk1) to the address tag received with the I/O request, and then RAIDA executes the I/O on pdisk1. When the I/O returns, its path tag is returned with any data or status information to the requesting system.

Figure 3:
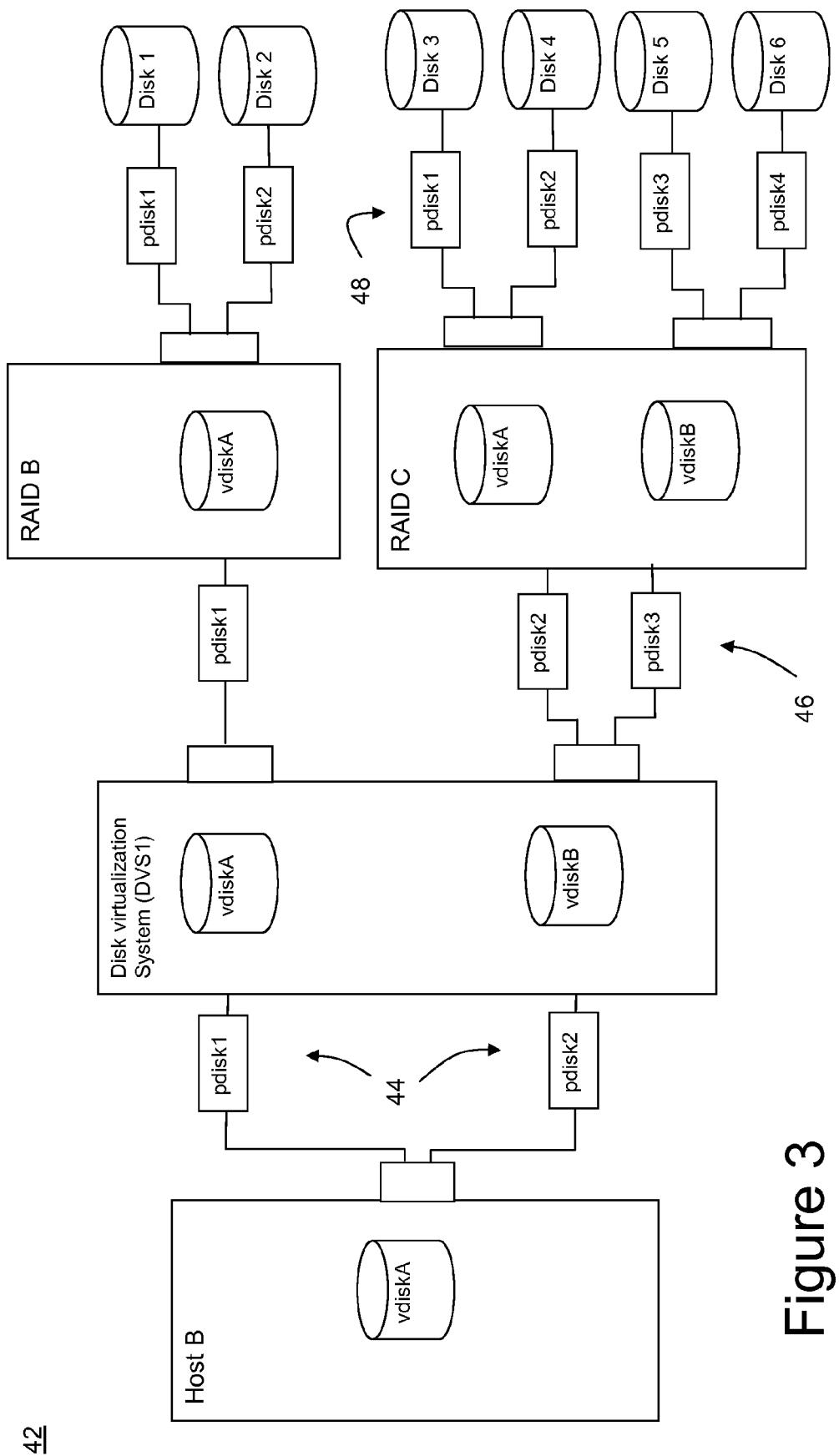
FIG. 3 depicts a further storage configuration in accordance with an embodiment of the invention.

FIG. 3 depicts a further storage configuration 42 in which a disk virtualization system (DVS1) resides between the host (HostB) and a pair of RAID system RAIDB and RAIDC. Consider the case where a virtual I/O operation is issued on vdiskA of HostB. If the I/O can be fulfilled from in-memory disk cache on HostB, the I/O is completed, and the address tag (HostB, vdiskA, cached) is returned with the response of the I/O operation. When the I/O reply returns, the complete path tag is retrieved on the host and saved along with other performance related information (such as response time or data size).

If the I/O request cannot be fulfilled from in-memory cache on HostB, the operating system determines which pdisk (pdisk1 or pdisk2) 44 contains the block of data being read. If, for example, the block is on HostB-pdisk2, the I/O request is tagged with (HostB, vdiskA, pdisk2) and it is executed. When the I/O returns, the complete path tag is retrieved and saved on the host along with other performance related information (such as response time or data size).

However, since pdisk2 is a vdisk presented to HostB by DVS1, DVS1 receives this I/O request as a request on its DVS1-vdiskB device. If DVS1 can fulfill the I/O request on vdiskB from its in-memory cache, it appends its address tag (DVS1, vdiskB, cached) to the address tag it received, and returns the tag with the data and status for the I/O response to the requesting system.

If DVS1 cannot fulfill the I/O request on vdiskB from its in-memory cache, since DVS1-vdiskB is striped on DVS1-pdisk2 and DVS1-pdisk3, DVS1 determines which pdisk (pdisk2 or pdisk3) 46 holds the block requested for vdiskB, and then appends its information to the address tag received with the I/O. For example, if the data is on DVS1-pdisk2, then DVS1 appends (DVS1, vdiskB, pdisk2) to the address tag received with the I/O request, and then DVS1 executes the I/O on pdisk2. When the I/O returns, its path tag is returned with any data or status information returned to the requesting system.

Since DVS1-pdisk2 is a vdisk presented to DVS1 by RAIDC, RAIDC receives this I/O request as a request on its RAIDC-vdiskA device.

If RAIDC can fulfill the I/O request on vdiskA from its in-memory cache, it appends its address tag (RAIDC, vdiskA, cache) to the address tag received with the I/O, and returns the tag along with any data or status with the I/O response to the requesting system.

If RAIDC cannot fulfill the I/O request on vdiskA from its in-memory cache, since RAIDC-vdiskA is striped on RAIDC-pdisk1 and RAIDC-pdisk2, RAIDC determines which pdisk 48 (pdisk1 or pdisk2) holds the block requested for vdiskA, and then appends the information to the address tag received with the I/O. For example, if the data is on RAIDC-pdisk1, then RAIDC appends (RAIDC, vdiskA, pdisk1) to the address tag received with the I/O request, and then RAIDC executes the I/O on pdisk1. When the I/O reply returns, its path tag is returned with any data or status information returned with the I/O response to the requesting system.

On the host system, the address tag can be extracted from the I/O reply and merged with the I/O response time and characteristics (e.g. block size) for performance monitoring.

This could be used either in individual event traces, or aggregated for performance monitoring.

FIGS. 4 and 5 show reports of illustrative path and performance information for the storage configurations of FIGS. 2 and 3, respectively. By way of illustration in FIG. 4, the host/vdisk 50 on which the I/O request was initiated is provided, as well as the path tag 52, the executing system 54, the executing location 56, the response time 58, and the block size 60. As can be seen for instance in the first entry of FIG. 4, the path tag (HostA,vdiskB, pdisk3), (RaidA,vdiskA,pdisk1) was returned. Referring also to FIG. 2, the path tag can readily be interpreted to see that HostA mapped vdiskB to pdisk3, which is a label for vdiskA of RAIDA, and RAIDA mapped vdiskA to pdisk1, which is a label for Disk 3. In this case RAIDA is thus identified as the executing system, with an execution location of pdisk1. A response time of 15 seconds and a block size of 4096 are also provided.

In other cases, such as the second entry in FIG. 4, the path tag (HostA,vdiskB, cache) indicating that HostA was the executing system and the executing location was the cache associated with vdiskB at the host.

As noted above, similar information could be obtained and utilized by either a RAID system or a disk virtualization system, as opposed to a host system. On a disk virtualization or RAID system, the incoming address path tag could be extracted to determine the source system associated with a local vdisk. If the same Host system vdisk mapped to several different vdisks on the RAID or disk virtualization system, then that information could be used to handle that group of vdisks similarly, for example using the same prefetch or caching method on all. FIG. 6 depicts an illustrative report obtained from either a disk virtualization or RAID system.

Figure 7:
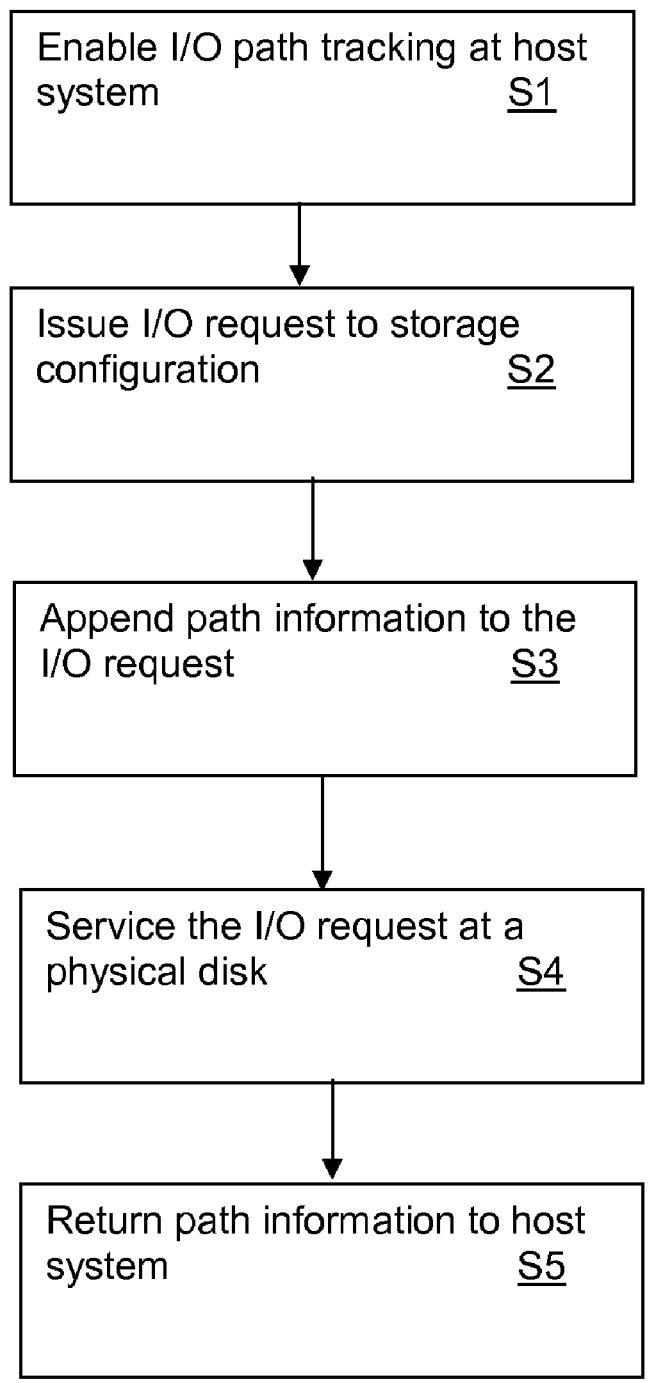
FIG. 7 depicts a flow chart of a method in accordance with an embodiment of the invention.

FIG. 7 depicts a flow chart of an illustrative method. At S1, I/O mapping-path tracking is enabled at a host system. As noted above, this can be accomplished, e.g., via a user interface which in turn sets a flag in the I/O request. At S2, the I/O request is issued to the storage configuration. This may be initiated by issuing the request to a virtual disk on the host system. At S3, mapping-path information is appended to the I/O request at each virtual storage node that processes the request. In one embodiment, mapping-path information is appended to an address tag that is provided as part of the I/O request. At S4, the I/O request is ultimately serviced (a read or write operation is performed) by a physical storage disk or in cache, and at S5, the mapping-path information is returned to the host system.

Referring again to FIG. 1, it is understood that path tracking manager 20 as well as path tagging 34 and analysis tool 36 may each be implemented using any type of computing device (i.e., computer system). Such a computing device generally includes a processor 12, input/output (I/O 14), memory 16, and a bus. The processor 12 may comprise a single processing unit, or be distributed across one or more processing units in one or more locations, e.g., on a client and server. Memory 16 may comprise any known type of data storage, including magnetic media, optical media, random access memory (RAM), read-only memory (ROM), a data cache, a data object, etc. Moreover, memory may reside at a single physical location, comprising one or more types of data storage, or be distributed across a plurality of physical systems in various forms.

I/O 14 may comprise any system for exchanging information to/from an external resource. External devices/resources may comprise any known type of external device, including a monitor/display, speakers, storage, another computer system, a hand-held device, keyboard, mouse, voice recognition system, speech output system, printer, facsimile, pager, etc. The bus provides a communication link between each of the components in the computing device and likewise may comprise any known type of transmission link, including electrical, optical, wireless, etc. Although not shown, additional components, such as cache memory, communication systems, system software, etc., may be incorporated.

Access may be provided over a network such as the Internet, a local area network (LAN), a wide area network (WAN), a virtual private network (VPN), etc. Communication could occur via a direct hardwired connection (e.g., serial port), or via an addressable connection that may utilize any combination of wireline and/or wireless transmission methods. Moreover, conventional network connectivity, such as Token Ring, Ethernet, WiFi, SAN or direct connections such as SCSI and Fibre Channel or other conventional communications standards could be used. Still yet, connectivity could be provided by conventional TCP/IP sockets-based protocol. In this instance, an Internet service provider could be used to establish interconnectivity. Further, as indicated above, communication could occur in a client-server or server-server environment.

It should be appreciated that the teachings of the present invention could be offered as a business method on a subscription or fee basis. For example, a computer system comprising a path tracking manager 20 and/or path tagger 34/analysis tool 36 could be created, maintained and/or deployed by a service provider that offers the functions described herein for customers. That is, a service provider could offer to deploy or provide the ability to provide mapping-path information in a storage configuration as described above.

It is understood that in addition to being implemented as a system and method, the features may be provided as one or more program products stored on a computer-readable storage medium, which when run, enables a computer system to provide a tracking manager 20, path tagger 34 and/or analysis tool 36. To this extent, the computer-readable storage medium may include program code, which implements the processes and systems described herein. It is understood that the term "computer-readable storage medium" comprises one or more of any type of physical embodiment of the program code. In particular, the computer-readable storage medium can comprise program code embodied on one or more portable storage articles of manufacture (e.g., a compact disc, a magnetic disk, a tape, etc.), on one or more data storage portions of a computing device, such as memory and/or a storage system.

As used herein, it is understood that the terms "program code" and "computer program code" are synonymous and mean any expression, in any language, code or notation, of a set of instructions that cause a computing device having an information processing capability to perform a particular function either directly or after any combination of the following: (a) conversion to another language, code or notation; (b) reproduction in a different material form; and/or (c) decompression. To this extent, program code can be embodied as one or more types of program products, such as an application/software program, component software/a library of functions, an operating system, a basic I/O system/driver for a particular computing and/or I/O device, and the like. Further, it is understood that terms such as "component", "subsystem" and "system" are synonymous as used herein and represent any combination of hardware and/or software capable of performing some function(s).

The block diagrams in the figures illustrate the architecture, functionality, and operation of possible implementations of systems, methods and computer program products according to various embodiments of the present invention. In this regard, each block in the block diagrams may represent a module, segment, or portion of code, which comprises one or more executable instructions for implementing the specified logical function(s). It should also be noted that the functions noted in the blocks may occur out of the order noted in the figures. For example, two blocks shown in succession may, in fact, be run substantially concurrently, or the blocks may sometimes be run in the reverse order, depending upon the functionality involved. It will also be noted that each block of the block diagrams can be implemented by special purpose hardware-based systems which perform the specified functions or acts, or combinations of special purpose hardware and computer instructions.

Although specific embodiments have been illustrated and described herein, those of ordinary skill in the art appreciate that any arrangement which is calculated to achieve the same purpose may be substituted for the specific embodiments shown and that the invention has other applications in other environments. This application is intended to cover any adaptations or variations of the present invention. The following claims are in no way intended to limit the scope of the invention to the specific embodiments described herein.

What is claimed is:

1. A system for tracking an input/output (I/O) mapping-path among a plurality of nodes in a storage configuration, the system having at least one computer device that performs a method, comprising:
    selecting an I/O request from among a plurality of I/O requests being serviced within the storage configuration;
    enabling I/O mapping-path tracking for the I/O request based on the selection, the storage configuration including a redundant array of inexpensive disks (RAID) system having a plurality of physical storage nodes accessed virtually via a path having a plurality of virtual storage nodes;
    at each of the plurality of virtual storage nodes that process the I/O request on the path traversed by the I/O request within the storage configuration to reach a storage destination:
        computing a virtual to physical storage translation;
        appending the virtual to physical storage translation to mapping-path information included with the I/O request; and
        forwarding the mapping path information along with the I/O request to a next one of the plurality of virtual storage nodes, when present, on the path; and
    returning the mapping-path information, that includes the virtual to physical storage translation of all of the plurality of virtual storage nodes on the path, to the host system.

2. The system of claim 1, wherein the method further comprises capturing mapping-path information from an I/O reply obtained from a node in response to servicing of the I/O request.

3. The system of claim 1, wherein each virtual storage node comprises a device selected from a group consisting of: a redundant array of inexpensive disks (RAID), a disk virtualization system, a storage array system, and a hardware controller.

4. The system of claim 1, wherein the each virtual storage node includes an I/O manager that maps the I/O request to one or more downstream nodes independently of the host system.

5. The system of claim 1, wherein the mapping-path information includes mapping details and a unique identifier of an associated virtual storage node.

6. The system of claim 1, wherein the method further comprises reporting an I/O mapping-path and performance data for an I/O request.

7. The system of claim 6, the method further comprising determining storage requirements for proposed workload changes based on mapping-path tracking results from a plurality of I/O requests.

8. The system of claim 6, wherein the performance data includes a determination of whether the I/O request was fulfilled with cache hit or a cache miss.

9. The system of claim 1, wherein each virtual storage node includes a virtual disk.

10. A method for tracking an input/output (I/O) mapping-path among a plurality of nodes in a storage configuration, comprising:
    selecting an I/O request from among a plurality of I/O requests being serviced within the storage configuration;
    enabling I/O mapping-path tracking at a host system for the I/O request based on the selection;
    issuing the I/O request to the storage configuration, wherein the storage configuration includes a redundant array of inexpensive disks (RAID) system having a plurality of physical storage nodes accessed virtually via a path having a plurality of virtual storage nodes;
    at each of the plurality of virtual storage nodes that process the I/O request on the path traversed by the I/O request to reach a storage destination:
        computing a virtual to physical storage translation;
        appending the virtual to physical storage translation to mapping-path information included with the I/O request; and
        forwarding the mapping-path information along with the I/O request to a next one of the plurality of virtual storage nodes, when present, on the path;
    servicing the I/O request at a physical disk; and
    returning the mapping-path information, that includes the virtual to physical storage translation of all of the plurality of virtual storage nodes on the path, to the host system.

11. The method of claim 10, wherein each virtual storage node comprises a device selected from a group consisting of: a redundant array of inexpensive disks (RAID), a disk virtualization system, a storage array system, and a hardware controller.

12. The method of claim 10, wherein the each virtual storage node that processes the I/O request maps the I/O request to one or more downstream nodes independently of the host system.

13. The method of claim 10, wherein the mapping-path information includes mapping details and a unique identifier of an associated virtual storage node.

14. The method of claim 10, further comprising generating a report that includes an I/O mapping-path and performance data for an I/O request.

15. The method of claim 10, wherein each virtual storage node includes a virtual disk.

16. The method of claim 10, wherein each virtual storage node that processes an I/O request determines whether I/O mapping-path tracking is enabled by checking for a flag in a command associated with the I/O request.

17. The method of claim 10, further comprising:
    analyzing mapping-path information received from the host system at one of a virtual node or a physical disk; and
    altering an operation at one of the virtual node or physical disk based on the mapping-path information.

18. The method of claim 17, wherein an altered operation is selected from a group consisting of: a caching operation, a priority determination, and a prefetch operation.

19. A computer readable storage medium having a program product stored thereon for tracking an input/output (I/O) mapping-path among a plurality of nodes in a storage configuration that when executed, performs a method, comprising:

selecting an I/O request from among a plurality of I/O requests being serviced within the storage configuration;

enabling I/O mapping-path tracking for the I/O request based on the selection, the storage configuration including a redundant array of inexpensive disks (RAID) system having a plurality of physical storage nodes accessed virtually via a path having a plurality of virtual storage nodes;

at each of the plurality of virtual storage nodes that process the I/O request on the path traversed by the I/O request within the storage configuration to reach a storage destination:

computing a virtual to physical storage translation;

appending the virtual to physical storage translation to mapping-path information included with the I/O request; and forwarding the mapping path information along with the I/O request to a next one of the plurality of virtual storage nodes, when present, on the path; and returning the mapping-path information, that includes the virtual to physical storage translation of all of the plurality of virtual storage nodes on the path, to the host system.

20. The computer readable storage medium of claim 19, wherein the method further comprises capturing mapping-path information from an I/O reply obtained from a node in response to servicing of the I/O request.

21. The computer readable storage medium of claim 19, wherein each virtual storage node comprises a device selected from a group consisting of: a redundant array of inexpensive disks (RAID), a disk virtualization system, a storage array system, and a hardware controller.

22. The computer readable storage medium of claim 19, wherein the mapping-path information includes mapping details and a unique identifier of an associated virtual storage node.

23. The computer readable storage medium of claim 19, wherein the method further comprises reporting an I/O mapping-path and performance data for an I/O request.

24. The computer readable storage medium of claim 19, wherein the method further comprises automatically analyzing I/O mapping-path and performance data for an I/O request.

25. The computer readable storage medium of claim 19, wherein the method further comprises automatically determining storage requirements for proposed workload changes based on mapping-path tracking results from a plurality of I/O requests.

26. The computer readable storage medium of claim 19, wherein the performance data includes a determination of whether the I/O request was fulfilled with cache hit or a cache miss.

27. A method for deploying a system for tracking an input/output (I/O) mapping-path among a plurality of nodes in a storage configuration, comprising:

providing a computer infrastructure being operable to:

select an I/O request from among a plurality of I/O requests being serviced within the storage configuration;

enable I/O mapping-path tracking from a host system for the I/O request being serviced within the storage configuration based on the selection, the storage configuration including a redundant array of inexpensive disks (RAID) system having a plurality of physical storage nodes accessed virtually via a plurality of virtual storage nodes;

at each of the plurality of virtual storage nodes that process the I/O request on the path traversed by the I/O request to reach a storage destination:

compute a virtual to physical storage translation;

append the virtual to physical storage translation to mapping-path information included with the I/O request; and forward the mapping-path information along with the I/O request to a next one of the plurality of virtual storage nodes, when present, on the path; and return the mapping-path information, that includes the virtual to physical storage translation of all of the plurality of virtual storage nodes on the path, to the host system.

* * * * *